UNITED STATES PATENT OFFICE 2,005,303

DYEING OF CELLULOSE DERIVATIVES

Louis Spiegler and Henry R. Lee, South Milwaukee, Wis., assignors to E. I. du Pont de Nemours & Company, Wilmington, Del., a corporation of Delaware No Drawing. Application January 25, 1933, Serial No. 653,482

8 Claims. (Cl. 8—5)

This invention relates to the dyeing or coloring of organic derivatives of cellulose. More particularly, this invention deals with the application of nitrogenous benzacridone derivatives, particularly nitro-acridones as dyestuffs for cellulose esters, such as cellulose acetate, cellulose ethers, or related fibers.

We have found that simple acridone compounds which are substituted by a nitro group form good dyestuffs for cellulose ester and related fibers, imparting thereto colors within the range of greenish yellow to orange, depending on the position of the nitro group and on the nature of other substituents which may be present in the nucleus.

Of particular value are acridones bearing a nitro group in position ortho or para to the meso NH group, hereinafter referred to as the 1 or 3 positions respectively. See formula below. These in turn may be further improved as to shade, affinity, or fastness qualities by substitution, preferably in the phenyl ring opposite to that bearing the nitro group. The rule, however, is not exclusive, since we found many valuable dyestuffs among those which have substituents in the same ring with the nitro group, or in both rings. Among the substituents, any of those commonly met with in aromatic nuclear substitution may be used. The group comprises inorganic as well as organic radicals, such as chloro, bromo, nitro, amino, methyl, methoxy, ethoxy, hydroxy, and others.

The above effect is particularly surprising in view of the circumstance that the simple acridone compounds have not been known to this date as having dyeing qualities. The acridone compounds found in the art have generally been used as pharmaceutical compounds or for the synthesis of acridines, which in turn were used for the synthesis of therapeutic compounds and a limited series of dyestuffs for mordanted fiber. That acridone derivatives substituted by nitro groups would have affinity for cellulose esters or related fibers was entirely unforeseen.

The application of our novel dyestuffs to the fiber may be effected in any of the known manners for applying water insoluble or sparingly soluble dyestuffs to celanese fibers. Generally, these methods involve effecting, either mechanically, or by the aid of emulsifying or dispersing agents, a dispersion of the dyestuff in water and then steeping the fiber in this suspension and warming up to a temperature not above the boiling point of water.

Without limiting our invention to any particular procedure, the following example, in which parts by weight are given, will serve to illustrate our preferred mode of operation.

Example

The particular color selected, for instance, 1-nitro-acridone, may be made up into a wet dyestuff paste by milling 10 parts of the same with 90 parts of water until uniformly dispersed.

Alternatively, the color may be made up into a dry dyestuff powder by milling 10 parts of the color compound, say 1-nitro-acridone, with 90 parts of inert, water-soluble material such as sugar, soap, Glauber's salt, common salt, dextrine, or a mixture of these, with or without a dispersing agent, such as an alkylated naphthalene-sulfonic acid or a salt thereof, sulfonated ricinoleic acid, a sulfonic acid of the abietene family or a salt thereof, rosin soap, aldehyde-sulfo-aryl condensation products, dry sulfite waste concentrates, etc.

1 part of the above dyestuff paste or powder is stirred up in 20 parts of a 10% soap solution to a smooth paste. To this, 50 parts of hot water are added, and stirring is continued until the color is effectively dispersed. The paste is then diluted with water to a total of 500 parts. A suitable volume of the above suspension, depending on the desired strength of the dyeing and the weight of cellulose acetate to be dyed, is diluted with warm water (at 120° F.) to fifty times its own volume. The cellulose-acetate fiber, which has preferably first been subjected to a light soaping at 140° F. in a ½% soap solution, is now introduced, and the dye bath is maintained at 120° F. for 5 minutes. It is then warmed up to 160° F.–200° F. and held at this temperature for ½ an hour. The fiber is then removed, rinsed and dried.

If the color in the above procedure was 1-nitro-acridone, the fiber will be found dyed a bright yellow color of good fastness to light, acid and alkali. If other acridone compounds are used, the results will be found as indicated in the following table. The positions of the substituents in this table are as indicated in the following formula:

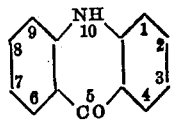

| Compound | Color on cellulose acetate | Affinity for fiber | Fastness to light |
|---|---|---|---|
| 1-nitro-acridone | Yellow | Excellent | Excellent. |
| 2-nitro-acridone | Yellow | Weak | Good. |
| 3-nitro-acridone | Yellow | Weak | Good. |
| 1-methyl-4-nitro-acridone | Yellow | Weak | Good. |
| 1-nitro-3-methyl-acridone | Orange-yellow | Excellent | Good. |
| 1-nitro-3-methoxy-acridone* | Orange | Fair | Good. |
| Brominated 1-nitro-acridone (mono)** | Greenish yellow | Excellent | Good. |
| Brominated 1-nitro-acridone (di)** | Greenish yellow | Excellent | Good. |
| 1,3-dinitro-acridone | Yellow | Good | Good. |
| 1,8-dinitro-acridone* | Yellow | Excellent | Good. |
| 1,9-dinitro-acridone* | Greenish yellow | Good | Excellent. |
| 3,7-dinitro-acridone | Yellow | Weak | |
| x,1-dinitro-acridone** | Greenish yellow | Good | Good. |
| 1-nitro-9-methoxy-acridone* | Orange-yellow | Good | Good. |
| 1-nitro-7-ethoxy-acridone* | Golden orange | Good | Good. |
| x,y,1-trinitro-acridone** | Orange-yellow | Good | Weak. |

In the case of the compounds marked (*), the synthesis briefly consists of condensing anthranilic acid by the aid of copper and acid absorbing agents with the corresponding substituted bromo- or chloro-benzene, or by condensing ortho-halogen-benzoic acid with a substituted aniline. The resulting substituted diphenylamine-2-carboxylic acid is ring closed in known manner to give the corresponding acridone. (Compare formation of 9-nitro-acridone, Clemo, Perkins and Robinson, Journal of the Chemical Society, vol. 125, page 1770.)

In the case of the compounds marked (**), 1-nitro-acridone is first prepared and then subjected to further treatment, such as bromination or nitration to the desired stage, as the case may be. The further nitration of 1-nitro-acridone may be carried out according to the process described in Berichte, vol. 64, pages 2383–2386. The mono- and di-brominated 1-nitro-acridones may be produced by brominating the 1-nitro-acridone in acetic acid at reflux temperature, using theoretical amounts of bromine.

The dyestuffs of our novel series exhibit superior fastness to acid and to alkali. They do not dye cotton or wool, and are therefore excellently adapted for dyeing union fabrics, that is, fabrics containing threads of cotton or wool and threads of cellulose acetate, where it is desired to color the latter only.

It will be understood that our invention is susceptible to a wide range of variations and modifications, without departing from the spirit of this invention.

We claim:

1. The process which comprises dyeing cellulose ester fibers with an acridone compound of the general formula:

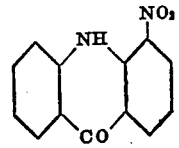

2. The process which comprises dyeing cellulose ester fibers with an acridone compound of the general formula:

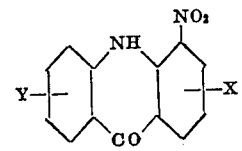

wherein X and Y stand for hydrogen or a substituent of the group comprising halogen, nitro, amino, alkyl, alkoxy, and hydroxy.

3. The process of dyeing cellulose ester fibers which comprises applying thereto 1-nitro-acridone.

4. The process of dyeing cellulose ester fibers which comprises applying thereto 1,9-dinitro-acridone.

5. Cellulose ester material colored with an acridone compound as defined in claim 1.

6. Cellulose ester material colored with an acridone compound as defined in claim 2.

7. Cellulose ester material colored with an acridone compound as defined in claim 3.

8. Cellulose ester material colored with an acridone compound as defined in claim 4.

LOUIS SPIEGLER.
HENRY R. LEE.